Sept. 1, 1959   G. R. RYDER   2,901,765
WINDSHIELD WIPER ASSEMBLY
Filed July 11, 1957

INVENTOR.
GEORGE R. RYDER
BY D. C. Staley
HIS ATTORNEY

United States Patent Office 2,901,765
Patented Sept. 1, 1959

2,901,765
WINDSHIELD WIPER ASSEMBLY

George R. Ryder, Birmingham, Mich., assignor to General Motors Corporation, Detroit, Mich., a corporation of Delaware Application July 11, 1957, Serial No. 671,354

7 Claims. (Cl. 15—255)

This invention pertains to the art of windshield cleaning and particularly to an improved windshield wiper assembly on a vehicle having a curved windshield.

Heretofore, it has been proposed to incorporate means for maintaining a wiper blade substantially normal to a curved windshield surface throughout its wiping stroke. This is generally referred to as controlling the attitude of the wiper blade so as to effect satisfactory cleaning of a curved windshield surface. One arrangement of this type includes a wiper arm having a shaft mounted section, a rockable arm mounted section and a blade carrying section. The blade carrying section is pivoted to the rockable section and spring biased toward the windshield. The rockable section is journalled on a pin carried by the shaft mounting section and includes a cam follower which engages a stationary contoured cam so that the blade carrying section of the arm is automatically displaced about the longitudinal axis of the wiper arm during the wiping stroke. In previous designs of this type the cam and cam follower were exposed at all times to dirt and other foreign matter which tend to impair proper operation. In addition, the cam and cam follower mechanism detracts from the appearance of the vehicle to which they are attached. The present invention relates to an improved wiper assembly of the aforementioned type wherein part of the cam and part of the cam follower are concealed so as to be less susceptible to malfunctioning due to foreign matter and also improve the appearance of their installation. Accordingly, among my objects are the provision of a windshield cleaner including improved mechanism for controlling the attitude of a windshield wiper blade during its oscillation; and the further provision of an improved windshield wiper assembly for vehicles having means for controlling the displacement of a wiper arm about its longitudinal axis.

The aforementioned and other objects are accomplished in the present invention, by embodying an integral cover and cam whereby one surface of the cam and part of the cam follower are concealed by the cover plate. Specifically, the windshield cleaner includes a transmission assembly comprising a shaft having a pulley assembly attached thereto. The pulley assembly is connected to the inner end of a transmission shaft and the driving arrangement therefor may be of the type disclosed in the McClelland Patents No. 2,617,315 and No. 2,660,894, assigned to the assignee of this invention. The transmission shaft is journalled in a stationary housing which is carried by a bracket attached to the cowl of the vehicle. In the disclosed embodiment, the vehicle cowl has a pair of openings therein, the openings being located on opposite sides of the center of the windshield. A transmission assembly is disposed within each opening in the cowl, the outer end of the transmission shaft projecting therefrom.

The outer end of the transmission shaft has a drive burr attached thereto arranged to telescopically receive a shaft mounting section of a wiper arm. The wiper arm also includes a rockable section and a blade carrying section. The rockable section is journalled on a pin carried by the shaft mounting section, and includes a cam follower of the double acting type including a pair of spaced legs, or fingers. The blade carrying section is pivotally connected to the rockable part on an axis transverse to the longitudinal axis of the blade, and is spring biased towards the windshield in a conventional manner.

The cam follower on the rockable arm section is arranged to straddle a stationary, double acting cam. The stationary cam is contoured so that during the wiping stroke, the rockable arm section and the blade carrying section are rotated about the longitudinal arm axis so as to maintain the blade at a substantially normal attitude relative to the windshield. A wiper assembly of this general type is disclosed in copending application Serial No. 517,605, filed June 23, 1955, now Patent No. 2,866,220, in the name of Charles P. Roth, and assigned to the assignee of this invention.

In the present invention, the stationary cam constitutes an integral part of a cover plate for enclosing a portion of the transmission assembly and closing the opening in the cowl. The cover plate is attached to the vehicle cowl, and the cam surface is formed on a depending portion thereof which partially encircles the transmission shaft. One surface of the cam is concealed by the cover, and the cam is straddled by the cam follower attached to the rockable arm section. Thus, the susceptibility of the assembly to malfunction by reason of accumulated foreign matter is appreciably reduced, and the appearance of the wiper assembly on the vehicle is materially improved.

Further objects and advantages of the present invention will be apparent from the following description, reference being had to the accompanying drawing, wherein a preferred embodiment of the present invention is clearly shown.

Figure 1:
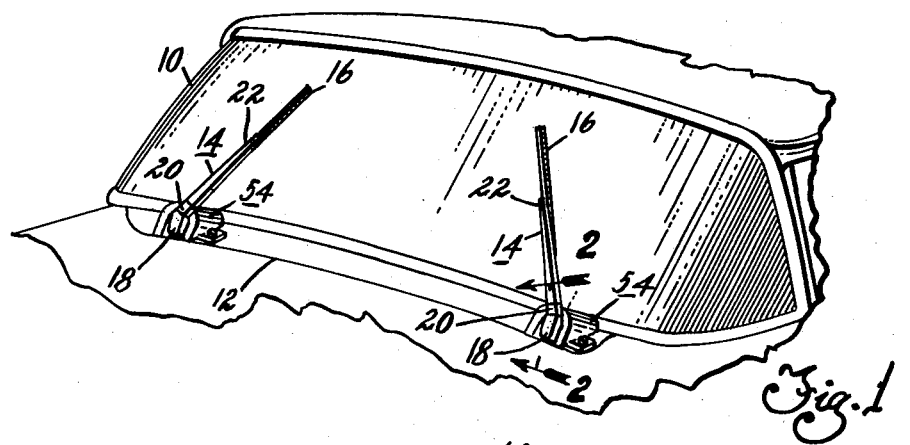
Figure 1 is a fragmentary view, in elevation, of a vehicle equipped with the improved windshield cleaner of this invention.
Figure 2:
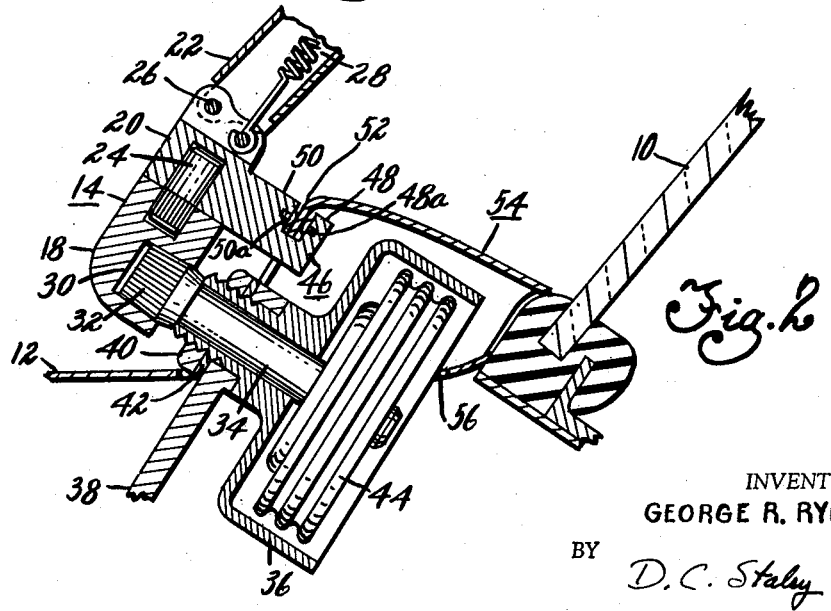
Figure 2 is an enlarged fragmentary sectional view taken along line 2—2 of Figure 1.

With particular reference to Figure 1, the vehicle is shown having a wrap-around windshield 10 and a cowl 12. The windshield cleaning apparatus includes a wiper arm 14 disposed on each side of the center line of the windshield, each wiper arm carrying a wiper blade 16. The wiper arms and blades are driven by a motor, not shown, and are oscillated assymmetrically as indicated in Figure 1. As seen in Figures 1 and 2, each wiper arm 14 comprises a shaft mounting section 18, a rockable section 20 and a blade carrying section 22. The rockable section 20 is connected to the mounting section 18 by a pin 24, the inner end of which is rigidly connected to the mounting section, and the outer end of which is disposed within a cylindrical recess of the rockable section, so that the section 20 and the blade carrying section 22 are free to pivot relative to the shaft mounting section 18 about the longitudinal arm axis.

The blade carrying section 22 is pivotally connected to the rockable section 20 by means of a transversely extending pin 26, and is biased towards the windshield 10 by menas of a spring 28 opposite ends of which are connected to the rockable section 20 and the blade carrying section 22. The blade carrying section 22 carries the wiper blade 16, and the spring 28 maintains the blade 16 in contact with the windshield surface under pressure.

The shaft mounting section 18 has a socket 30 therein arranged to receive a serrated head, or drive burr, 32 attached to the outer end of a transmission shaft 34. The transmission shaft is rotatably journalled in a housing 36 carried by a bracket 38 suitably attached to the vehicle cowl 12. As seen in Figure 2, the transmission shaft 34 is maintained in assembled relation with the bracket 38 by a nut 40 which threadedly engages a portion of the housing 36, a suitable washer 42 being interposed between the nut 40 and the bracket 38.

The inner end of the transmission shaft 34 has a pulley assembly 44 drivingly connected thereto. The pulley assembly 44 is disposed within a pulley housing which, as shown, is integral with the shaft housing 36. In accordance with conventional practice, the pulley assembly 44 may be connected with the motor, not shown, by means of a flexible cable drive of the type shown in the aforementioned McClelland patent. The shaft 34 with the pulley assembly 44 will be hereinafter referred to as a transmission assembly, and it is to be understood that each wiper arm and blade assembly is driven by a transmission assembly.

In order to impart rocking movement to the sections 20 and 22 of the arm 14 about the longitudinal arm axis so as to maintain the wiper blade substantially normal to the curved windshield surface, positioning means including cooperable cam and follower parts are employed. Thus, the rockable arm section 20 has an integral cam follower 46 attached thereto. The cam follower includes spaced legs, or fingers, 48 and 50 which present an upwardly extending slot. The fingers 48 and 50 are arranged to straddle a stationary, double acting cam surface 52 which is formed as an integral part of a cover plate 54.

Figure 3:
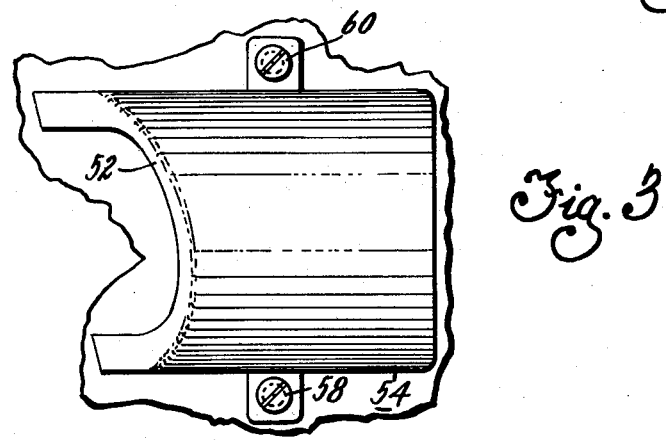
Figure 3 is a plan view of the combined cover and cam plate of the improved windshield wiper assembly.

As seen in Figure 3, the cover plate 54 comprises an integral metal stamping suitably contoured to close the opening 56 in the cowl 12 within which the transmission assembly is disposed. The double acting cam surface 52 is formed on the front surface thereof and partially encircles the transmission assembly. The cover plate is attached to the vehicle cowl by a pair of screw threaded members 58 and 60, so that the fingers 48 and 50 of the cam follower straddle the cam surface 52. The surfaces of cam 52 are suitably contoured so as to maintain the wiper blade substantially normal to the windshield surface throughout the wiping stroke.

In the improved wiper assembly of this invention one surface of the cam and one finger, or leg, of the cam follower are enclosed by the cover plate so as to exclude foreign matter therefrom. With this arrangement the likelihood of malfunctioning of the apparatus due to an accumulation of foreign matter on the cam surfaces is materially reduced, since the exposed cam surface on the cover plate can easily be kept clean. Moreover, by concealing part of the cam mechanism, the appearance of the wiper installation is appreciably improved. In order to reduce the friction between the surfaces of the cam follower and the cam, the fingers 48 and 50 of the cam follower may have attached thereto suitable bearing formations as indicated by numerals 48a and 50a.

While the embodiment of the invention as herein disclosed constitutes a preferred form, it is to be understood that other forms might be adopted, as may come within the scope of the claims which follow.

What is claimed is as follows:

1. A windshield cleaner for a vehicle having a curved windshield and a cowl, including, an oscillatable shaft journalled in said vehicle and disposed in an opening in said cowl, a wiper arm fixed on said shaft, a wiper blade carried by said arm for oscillatory movement across the windshield, means for adjusting the attitude of the wiper blade relative to the windshield during oscillatory movement thereof including cooperable cam and follower parts with one part straddling an edge of the other part, and means attached to said cowl for closing the opening therein having an integral portion constituting one of said parts.

2. A windshield cleaner for a vehicle having a curved windshield and a cowl, including, an oscillatable shaft journalled in said vehicle and disposed within an opening in said cowl, a wiper arm fixed on said shaft, a wiper blade carried by said arm for oscillatory movement across the windshield, means for adjusting the attitude of the wiper blade relative to the windshield during oscillatory movement thereof, including, cooperable cam and follower parts with one part straddling an edge of the other part, and a cover plate attached to said cowl for closing the opening therein having an integral portion constituting one of said parts.

3. A windshield cleaner for a vehicle having a curved windshield and a cowl, including, an oscillatable shaft journalled in said vehicle and disposed within an opening in said cowl, a wiper arm connected to said shaft and pivoted on an axis extending lengthwise of the arm and substantially radially to the axis of the shaft, a wiper blade carried by said arm, position controlling means operating automatically with the angular position of the shaft for controlling the position of said arm including cooperable cam and follower parts with one part straddling an edge of the other part, and means attached to said cowl for closing the opening therein and constituting one of said parts.

4. A windshield cleaner for a vehicle having a curved windshield and a cowl, including, an oscillatory drive shaft journalled in said vehicle and disposed in an opening in said cowl, a wiper arm supported on said shaft for oscillation thereby, said wiper arm including a shaft mounted section fixed on said shaft, a rockable section rotatably supported on said shaft mounted section and a wiper carrying section supported on said rockable section, a wiper blade mounted on said wiper carrying section, a cover plate attached to said cowl for closing the opening therein having an integral portion constituting a cam, and a cam follower carried by the rockable arm section straddling said cam for adjusting the attitude of the wiper blade during oscillation of the wiper arm across the windshield.

5. A windshield cleaner for a vehicle having a curved windshield and a cowl, including, an oscillatory drive shaft journalled in said vehicle and disposed in an opening in said cowl, a wiper arm supported on said shaft for oscillation thereby, said wiper arm including a shaft mounted section fixed on said shaft, a rockable section rotatably supported on said shaft mounted section and a wiper carrying section supported on said rockable section, a wiper blade mounted on said wiper carrying section, a cover plate attached to said cowl for closing the opening therein having an integral downwardly extending portion constituting a cam, and a cam follower carried by the rockable arm section having a pair of upwardly extending spaced fingers straddling said cam for adjusting the attitude of the wiper blade during oscillation of the wiper arm across the windshield.

6. A windshield cleaner for a vehicle having a curved windshield and a cowl, including, an oscillatory drive shaft journalled in said vehicle and disposed in an opening in said cowl, a wiper arm supported on said shaft for oscillation thereby, said wiper arm including a shaft mounted section fixed on said shaft, a rockable section rotatably supported on said shaft mounted section and a wiper carrying section supported on said rockable section, a wiper blade mounted on said wiper carrying section, a cover plate attached to said cowl for closing the opening therein, a double acting cam carried by said cover plate having a pair of contoured surfaces, and a cam follower carried by the rockable arm section having a pair of upwardly extending spaced fingers straddling said cam for adjusting the attitude of the wiper blade during oscillation of the wiper arm across the windshield, one of said contoured cam surfaces and one of said fingers being enclosed by said cover plate so as to exclude foreign matter therefrom.

7. A windshield cleaner for a vehicle having a curved windshield and a cowl, including, a transmission assembly having an oscillatory drive shaft and a housing attached to said cowl and rotatably supporting said drive shaft, a wiper arm connected to said shaft and pivoted on an axis extending lengthwise of the arm and substantially radially to the axis of said shaft, a wiper blade carried by said arm, position controlling means operating automatically with the angular position of the shaft for controlling the position of said arm including cooperable cam and follower parts, and a cover plate attached to said cowl for enclosing a portion of said transmission assembly, one of said parts being carried by said cover plate.

References Cited in the file of this patent

UNITED STATES PATENTS

| | | |
|---|---|---|
| 2,412,319 | Carey | Dec. 10, 1946 |
| 2,691,186 | Oishei et al. | Oct. 12, 1954 |